April 21, 1925.

L. K. DAVIS

ENDLESS TRACK VEHICLE

Filed March 21, 1923  4 Sheets-Sheet 1

Inventor
Lewis K. Davis
by his Attorneys

April 21, 1925.
L. K. DAVIS
ENDLESS TRACK VEHICLE
Filed March 21, 1923 4 Sheets-Sheet 2
1,534,362
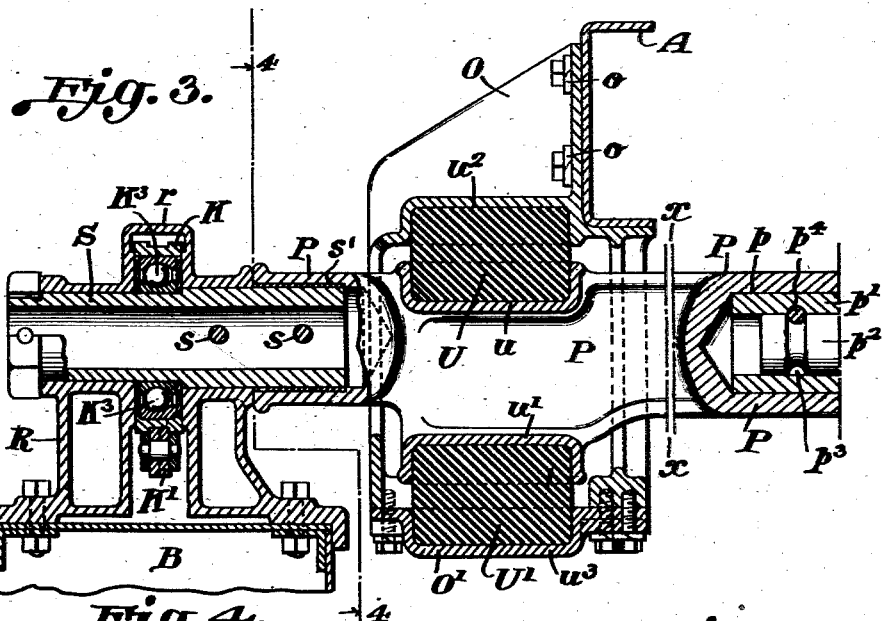
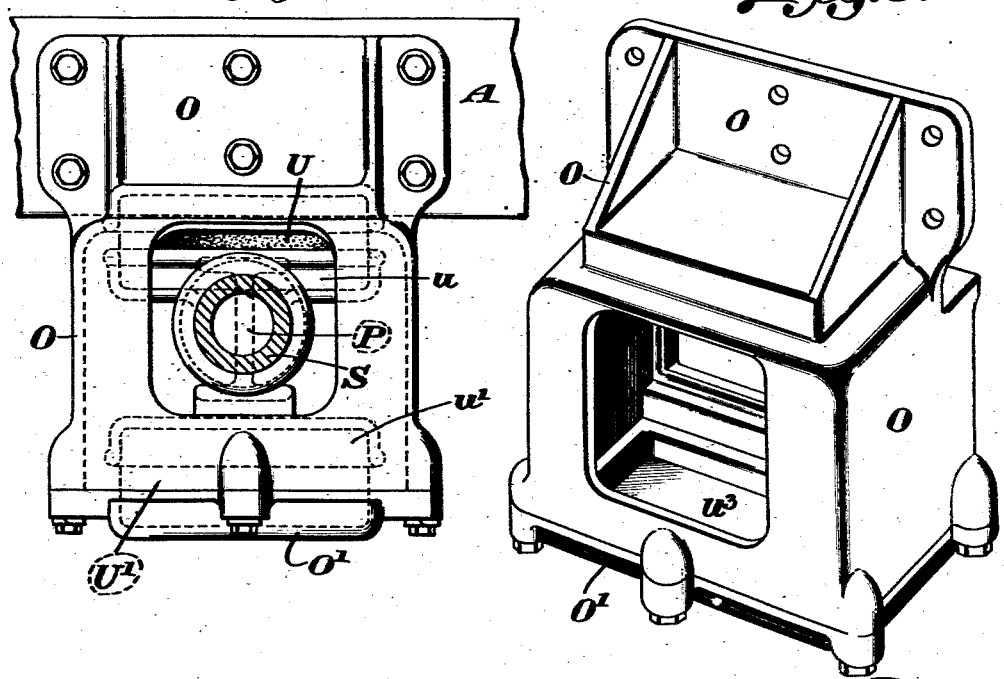
Inventor
Lewis K. Davis
by his Attorneys
Baldwin Wight April 21, 1925.

L. K. DAVIS 1,534,362

ENDLESS TRACK VEHICLE

Filed March 21, 1923

Inventor
Lewis K. Davis
by his Attorneys

April 21, 1925.
L. K. DAVIS
ENDLESS TRACK VEHICLE
Filed March 21, 1923    4 Sheets-Sheet 4
1,534,362
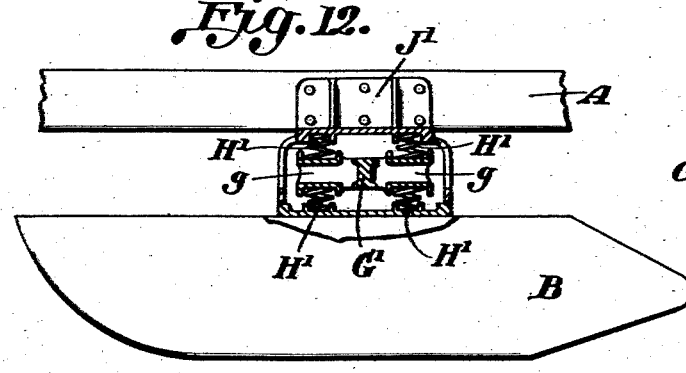
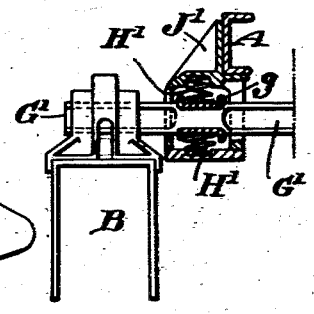
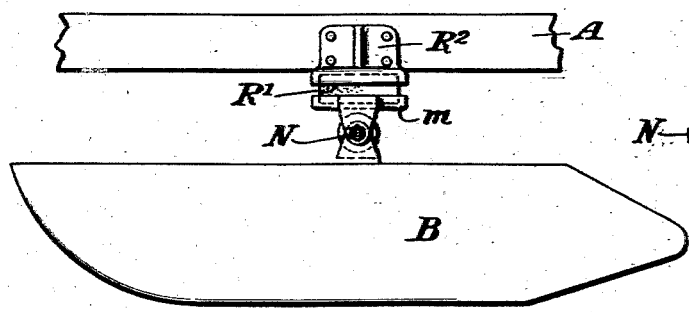
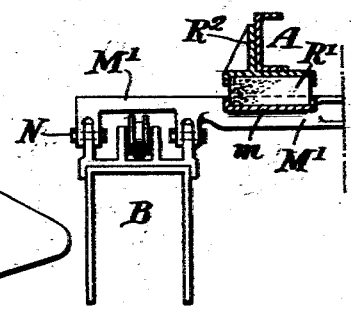
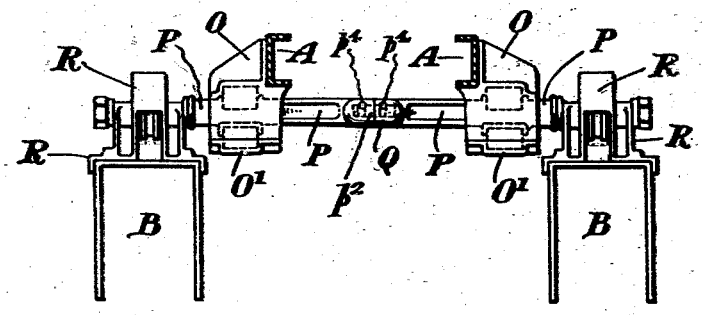
Inventor
Lewis K. Davis
by his Attorneys Patented Apr. 21, 1925.

1,534,362

UNITED STATES PATENT OFFICE.

LEWIS K. DAVIS, OF WASHINGTON, DISTRICT OF COLUMBIA.

ENDLESS-TRACK VEHICLE.

Application filed March 21, 1923. Serial No. 626,521.

*To all whom it may concern:*

Be it known that I, LEWIS K. DAVIS, a citizen of the United States, residing in Washington, District of Columbia, have invented certain new and useful Improvements in Endless-Track Vehicles, of which the following is a specification.

This invention relates to motor vehicles of the class in which endless tracks or tractor belts carried by driving and idle pulleys are employed, and in which the body of the vehicle is supported by wheels or rollers mounted in sub-frames or longérons and connected with the vehicle body.

The object of my invention is to provide improved means for associating the longérons with the vehicle body in such manner that they may have a yielding connection therewith and a fore and aft rocking movement relative thereto.

In carrying out my invention the connection between the vehicle body and each longéron is made by means of yielding devices which may be in the form of rubber blocks or in the form of springs arranged in a novel way.

My invention may be applied to either a whole track machine or to a half track machine.

In the drawings I have shown so much of an endless track vehicle as is necessary to illustrate how my improvements are applied.

Figure 1 is a side elevation and Figure 2 a plan view of one form of tractor embodying my improvements.

Figures 3, 4, and 5 are views on an enlarged scale illustrating the manner in which the longéron supports the chassis or vehicle body.

Figure 3 is a sectional view, on the line 3—3 of Fig. 1.

Figure 4 shows a transverse section on the line 4—4 of Figure 3.

Figure 5 is a perspective view of one of the brackets which is attached to the chassis and which supports yielding devices such as rubber blocks forming part of the connection between the chassis and the longéron.

The remaining figures of the drawings show modified constructions.

Figure 1:
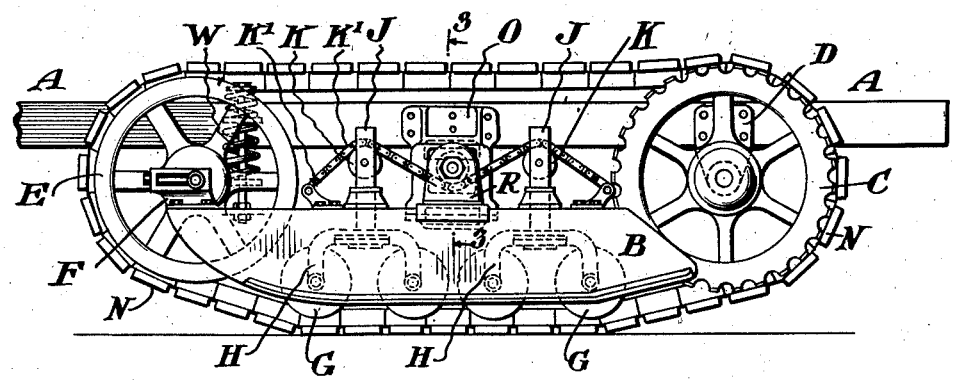
Figure 2:
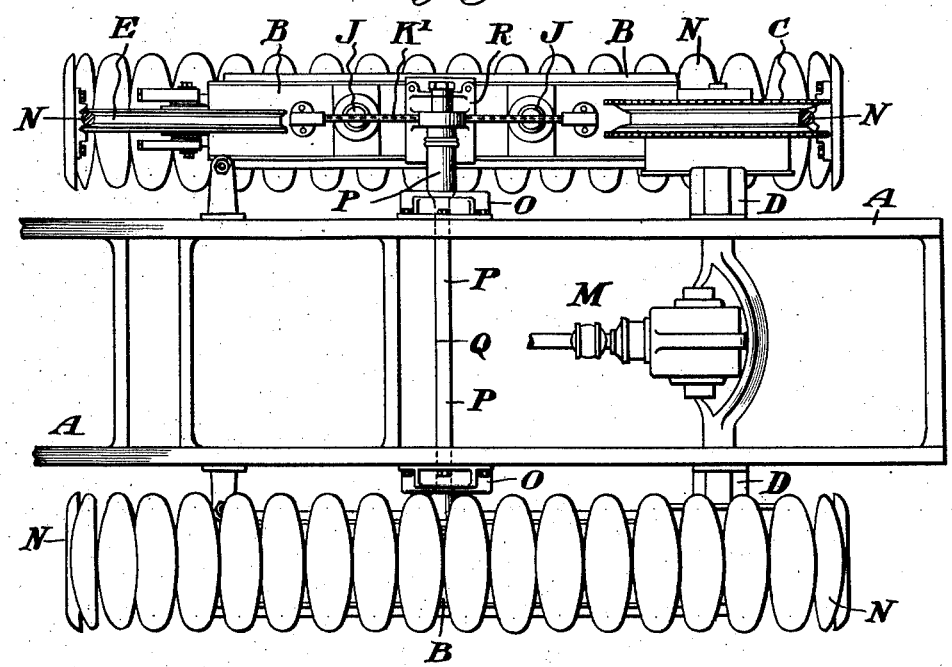
Figure 6:
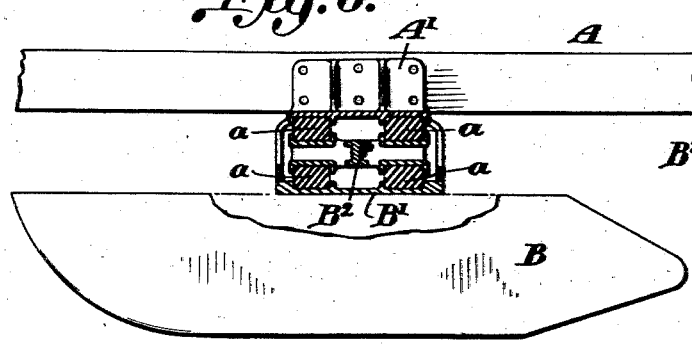

Figure 6 is a sectional view illustrating how a longéron is yieldingly connected with the chassis by means of four rubber blocks.

Figure 7:
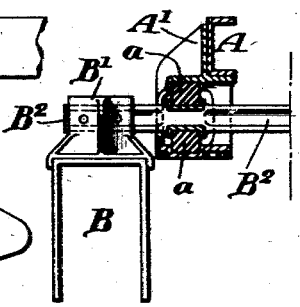

Figure 7 is a sectional view of that form of the invention shown in Figure 6.

Figure 8:
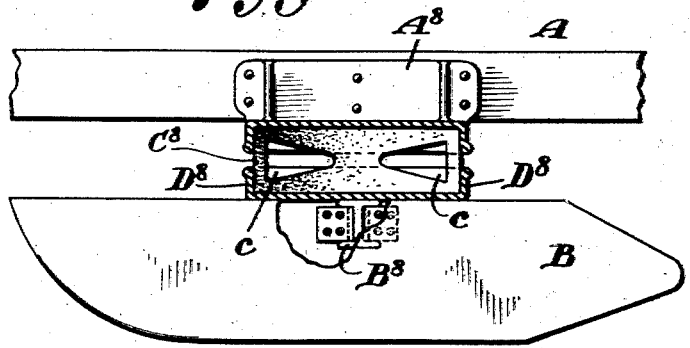

Figure 8 illustrates a further modification in which a single block of rubber or similar yielding material is interposed between the longéron and the chassis.

Figure 9:
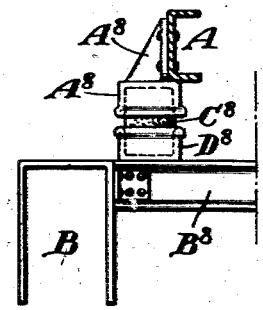

Figure 9 is another view of that form of the invention shown in Figure 8.

Figure 10:
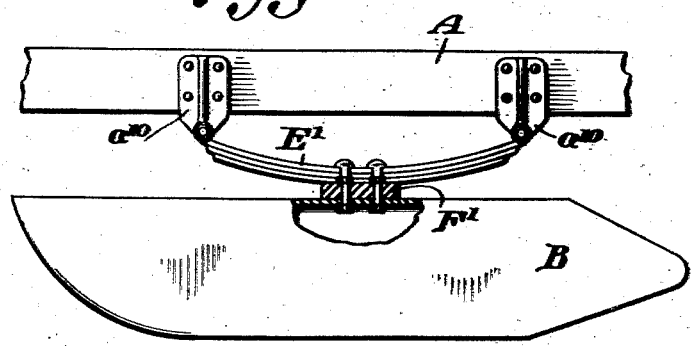

Figure 10 illustrates a modification in which a leaf spring is interposed between the longéron and the chassis providing not only a yielding connection therebetween but also allowing of a fore and aft rocking movement as is the case in the preceding figures where rubber blocks are used.

Figure 11:
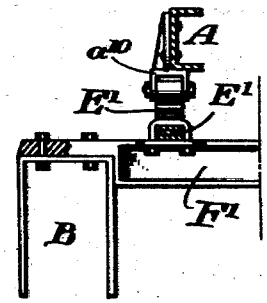

Figure 11 is a sectional view of the invention shown in Figure 10.

Figure 12 shows a further modification in which four helical springs are interposed between the longéron and the chassis and are suitably supported.

Figure 13 is a sectional view of the connecting devices shown in Figure 12.

Figure 14 illustrates a modification in which a solid rubber block is interposed between the longéron and the chassis and a pivotal connection is made between the longéron and a cross beam.

Figure 15 is a sectional view of the device shown in Figure 14.

Figure 16 is a view in transverse section of that form of the invention shown in Figures 1 to 5 inclusive.

The chassis or vehicle body frame is indicated at A and B indicates one of the sub-frames or longérons. Sprocket pulleys indicated at C have bearings in brackets D attached to the chassis and driving pulleys E are mounted in bearings in brackets F attached to the longérons. It will be understood that the constructions on opposite sides of the vehicle are the same. Each sub-frame or longéron is provided with bogies or body supporting devices which are preferably in the form of wheels or rollers G mounted in frames H provided with vertical posts J carrying rollers K over which extends on each side a chain, rope, or cable K'. The construction thus far described is shown in other patents and applications and is not broadly claimed herein. It will be understood that the driving pulleys C are connected with an axle operated by power driven mechanism M of suitable construction forming no part of the present invention. The tractor belts N may be of any preferred construction. Preferably there are universal joints between the tractor shoes, but this feature also forms no part of the present invention, which primarily relates to a connection between the vehicle body or chassis and the longéron intermediate the ends of the longéron. Heretofore in this class of vehicles there has been a pivotal connection formed by employing a cross shaft extending through brackets projecting upwardly from the longéron. This construction allowed the longéron to have a rocking movement fore and aft but this connection is not a yielding one but is hard and rigid. I may provide for this rocking movement by including in the connections blocks or pieces of rubber or similar yielding or elastic material, or I may employ springs of various kinds such as leaf springs, coil springs, or helical springs.

In Figures 1 to 5, inclusive, I have shown a construction in which two pieces of rubber are included in the rocking connection and as shown these rubber blocks are suitably housed and supported. On each side of the vehicle there is a bracket O shown in perspective in Figure 5. It has an opening through it and it is bolted to one of the side beams of the chassis as indicated at $o$. The two brackets O are preferably located about midway between the front and rear ends of the longérons and through these brackets extends a cross beam P. This cross beam is divided into two sections as indicated in Figure 16 and each section of the cross beam is provided with a socket or recess $p$ as indicated most clearly in Figure 2.

In Figure 3 this cross beam is shown broken away at $x$ while in Figure 16 the central arrangement of the two sections is more plainly illustrated. The two sections of the cross beam are connected as indicated at Q, so that one may rock independently of the other. Other such connections may, if desired, be employed. As illustrated the inner end of each beam section P is formed with a recess $p$ into which extends a tube $p'$ which connects the two sections of the beam and which receives a pin $p^2$ formed with annular grooves $p^3$ at opposite ends. Pins $p^4$ extend through the inner ends of beam sections through the tube $p'$ and into the annular grooves $p^3$ in the pin $p^2$. The construction is such that one beam section can rock without imparting a rocking movement to the other. By this arrangement as will be hereinafter described, the longéron on one side of the vehicle may rock while the longéron on the other side of the vehicle has no such rocking movement. The longéron B on each side of the vehicle carries a bracket R which receives a sleeve S which is bolted or otherwise firmly secured to the bracket as indicated at $s$ and the inner end of this sleeve extends into a socket $s'$ in the end of the cross beam P. The bracket R is provided with a housing $r$ for a roller or chain pulley K under which extends the chain K'. The pulley K is provided with ball bearings or roller bearings $K^3$ of suitable construction so that said pulley may turn freely about the axis of the sleeve S. The cross beam P at each end portion is formed with a seat $u$ for a block U of rubber or similar yielding material and also with a seat $u'$ for another block U' of rubber or similar material. The upper portion of the block U enters a recess $u^2$ in the bracket O and the lower portion of the block U' enters a recess $u^3$ in the removable bottom piece O' of the bracket. The general operation is similar to that of other endless track vehicles. It will be understood that the wheels or rollers G with their frames H have vertical movement. The longérons are suspended from the posts J as heretofore while the vehicle body rests on the chains or cables between the posts.

In the construction shown the driving pulley C is supported on the chassis while the idle pulley E is supported on the front portion of the longéron, and as this portion of the longéron has an up and down movement and as it is desirable to normally hold the longéron horizontally as indicated, springs W arranged in any approved way and in the manner shown in other pending applications and patents may be employed.

It is desirable, as before stated, that the connection between the longéron and the vehicle body should be a yielding one, and this connection should be such as to allow the longéron to rock fore and aft. The blocks U, U' of rubber or similar yielding material afford desirable means for providing such a connection. As the longérons rock fore and aft under varying conditions of use, the rubber blocks are compressed more or less in different parts thereof to permit such rocking movement and they also assume their normal position after the rocking movement is completed.

These connections between the longéron and the vehicle body may be made in various ways while still employing yielding devices for this purpose. In Figure 6 I have shown a construction in which four rubber blocks $a$ are employed. The longéron is provided with a bracket B' to which the cross beam $B^2$ is bolted. A bracket A' is secured to one of the side beams of the chassis and the rubber blocks $a$ are seated in recesses in the bracket and in the cross beam. This yielding connection permits the longéron to have a rocking movement. The construction shown in Figures 6 and 7 is used on both sides of the vehicle.

In Figures 8 and 9, a simplified construction is shown. The longérons are connected by a cross beam B⁸ and each end portion of the cross beam supports a housing D⁸ for the lower portion of a rubber block C⁸ which is formed with openings c to give to the block more resiliency or elasticity. Each block C⁸ is connected with a side beam of the vehicle body by a suitably formed bracket A⁸.

Instead of employing rubber or similar material I may employ springs of various kinds. In Figure 10 the longéron B is connected with the vehicle body on each side thereof by a leaf spring E′, the middle portion of which is attached to a cross beam F′ and the ends of which are connected with the chassis by brackets a¹⁰. It is obvious that the connection thus made is a yielding one and permits the longéron to rock fore and aft.

Figures 12 and 13 show a further modification in which four helical springs are employed for making the connection between the vehicle body and the longéron. The cross beam G′ is provided with arms g having seats for the springs H′. The bracket J′ is also formed with seats for the springs and the springs are suitably housed in the bracket. The cross beam G′ extends laterally beyond the brackets on opposite sides of the vehicle and is connected with the longéron in any suitable way or in ways shown in the preceding figures of the drawings.

Figures 14 and 15 show a modification in which a cross beam M′ extends from one side of the vehicle frame to the other. It is not made in sections with a rocking connection between the sections as indicated in Figure 16 but it has a rocking connection as shown at N with the longérons. The cross beam M′ at each end is formed with a seat m for a block R′ of yielding material and the bracket R² is adapted to receive the upper portion of the block R′. While the longéron can rock on the rocking connection N to a certain extent, the block R′ of yielding material also permits a rocking movement and affords a yielding connection between the cross beam M′ and the chassis and therefore a yielding rocking connection between the chassis and the longéron.

I claim as my invention:

1. An endless track vehicle comprising a vehicle body, endless tracks on opposite sides thereof, a subframe or longéron on each side of the vehicle body, body supporting devices engaging the tracks and carried by the longérons, a bracket attached to the vehicle body, a member connected to the longéron intermediate its front and rear ends, and passing through said bracket, and yielding devices interposed between the bracket and the member to allow the longéron to rock fore and aft about a horizontal axis extending through said bracket.

2. An endless track vehicle comprising a vehicle body, endless tracks on opposite sides thereof, a subframe or longéron on each side of the vehicle body, body supporting devices engaging the tracks and carried by the longérons, a bracket attached to the vehicle body, a support connected to the longéron intermediate its front and rear ends, a member rigidly connected to the support and passing transversely adjacent said bracket, and yielding means interposed between the bracket and the member to allow the longéron to rock fore and aft about a horizontal axis extending adjacent the bracket and member.

3. An endless track vehicle, comprising a vehicle body, endless tracks on opposite sides thereof, a subframe or longéron on each side of the vehicle body, body-supporting devices engaging the tracks and carried by the longérons, a beam to which the longérons are rigidly secured, and yielding connections between said beam and the vehicle body which allow the longérons and the beam to rock fore and aft about a horizontal axis extending through said yielding connections.

4. An endless track vehicle, comprising a vehicle body, endless tracks on opposite sides thereof, a subframe or longéron on each side of the vehicle body, body-supporting devices engaging the tracks and carried by the longérons, a sectional beam having its sections pivotally connected with each other and to which the longérons are rigidly attached, and yielding connections between said sectional beam and the vehicle body which permit the longérons to rock fore and aft about a horizontal axis extending through said beam and said yielding connections.

5. An endless track vehicle, comprising a vehicle body, endless tracks on opposite sides thereof, a subframe or longéron on each side of the vehicle body, body-supporting devices engaging the tracks and carried by the longérons, a horizontally arranged beam to which each longéron is rigidly connected, and yielding connections between said beam and the vehicle body which permit said beam and said longéron to rock about a horizontal axis extending through the beam and through the yielding connections.

6. An endless track vehicle, comprising a vehicle body, endless tracks on opposite sides thereof, a subframe or longéron on each side of the vehicle body, body-supporting devices engaging the tracks and carried by the longérons, a cross beam to which the longérons are connected, and yielding members interposed between said cross beam and the vehicle body which allow the longérons and the cross beam to rock fore and aft about a horizontal axis extending through said cross beam.

7. An endless track vehicle comprising a vehicle body, subframes for longérons on opposite sides of the vehicle, a cross beam made in sections connected with each other to rock independently, brackets depending from the vehicle body through which the opposite ends of the cross beam extend, means for connecting the longérons to the cross beam, and blocks of rubber or similar yielding material interposed between the said brackets and the cross beam and resisting torsional movement of the beam.

8. An endless track vehicle comprising a vehicle body, a cross beam made in sections pivotally connected near the middle, brackets depending from the vehicle body through which the opposite ends of the cross beam extend, blocks of yielding material interposed between the brackets and the cross beam, and resisting torsional movement of the beam, subframes or longérons connected with the outer ends of the cross beam, and an endless track passing around each longéron.

In testimony whereof, I have hereunto subscribed my name.

LEWIS K. DAVIS.